Nov. 30, 1971　　　　　F. W. CHILD　　　　　3,623,212
METHOD OF MAKING SUTURING MEMBER ON A DEVICE
Filed April 21, 1969　　　　　　　　　　　　2 Sheets-Sheet 1

INVENTOR.
FRANCIS W. CHILD
BY
Burd, Braddock & Bartz
ATTORNEYS

Nov. 30, 1971  F. W. CHILD  3,623,212

METHOD OF MAKING SUTURING MEMBER ON A DEVICE

Filed April 21, 1969  2 Sheets-Sheet 2

INVENTOR.
FRANCIS W. CHILD
BY
Burd, Braddock & Bartz

ATTORNEYS

United States Patent Office 3,623,212
Patented Nov. 30, 1971

3,623,212
METHOD OF MAKING SUTURING MEMBER ON A DEVICE
Francis W. Child, Maple Plain, Minn., assignor to Washington Scientific Industries, Inc., Minnetonka, Minn.
Filed Apr. 21, 1969, Ser. No. 817,988
Int. Cl. B23p 9/00
U.S. Cl. 29—445
19 Claims

ABSTRACT OF THE DISCLOSURE

A suturing member associated with an implantable device, as a heart valve, for accommodating sutures to join the device to living tissues. The suturing member has a porous fabric cover surrounding a semi-rigid core of plastic material. The outer surface of the plastic material is bonded to the inner surface of the fabric cover.

BACKGROUND OF THE INVENTION

Implantable mechanical devices, as heart valves, are used to replace natural portions of the various body organs. These devices are provided with sewing members that are initially sutured to surrounding living tissue. The sewing members have porous material to take advantage of the natural fibrosis which can occur between living tissue and the porous material. The porous material is retained on the device in a number of ways. A clamp ring and wire is shown in U.S. Pat. No. 3,099,016 to hold the sewing ring on the heart valve. A stainless steel ring encased in porous material is used in U.S. Pat. No. 3,396,409 to hold porous material on the heart valve. These sewing rings do not join or bond the body or core material to the porous cover material.

SUMMARY OF INVENTION

The invention is directed to a suturing member for implantable devices and the method of making the same. The suturing member has a cover means including biologically inert porous material for accommodating live tissue ingrowth or fibrosis between the tissue and porous material. The cover means surrounds a core of plastic material bonded to the inner surface of the cover means to confine body fluids and blood to the cover means. The plastic material does not penetrate the porous material and interfere with tissue ingrowth. The suturing member is made by locating uncured plastic material within the cover means. After the cover means and uncured plastic material have been shaped into the desired configuration, the plastic material is cured to bond the plastic material to the inside of the cover means.

An object of the invention is to provide a suturing member with a flexible core that does not collect blood and body fluids and does not interfere with tissue ingrowth into a porous cover bonded to the core. Another object of the invention is to form a suturing member directly on an implantable device in a manner which eliminates blood collecting spaces and cavities within the suturing member. A further object of the invention is to provide a suturing member which can be formed into a variety of shapes and which can be universally applied to all types of implantable devices.

Figure 1:
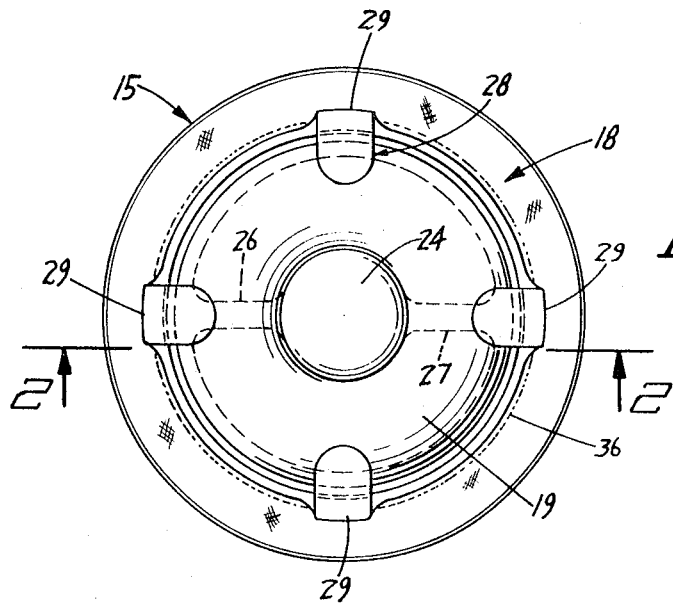
Figure 2:
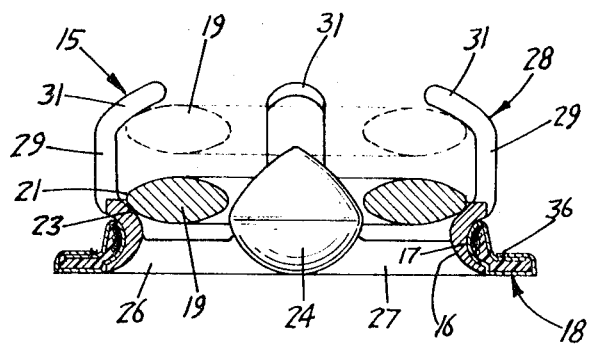
Figure 3:
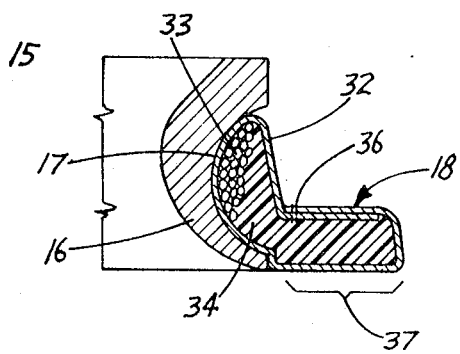
Figure 4:
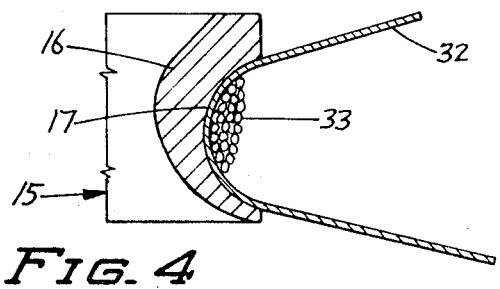
Figure 8:
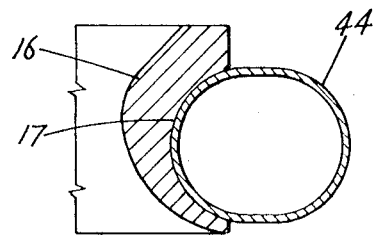
Figure 5:
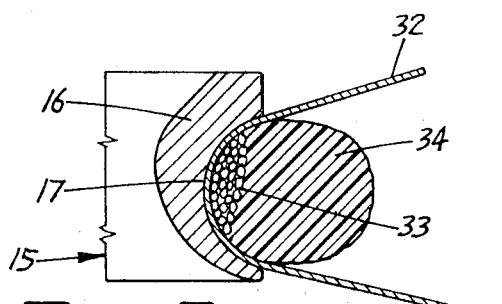
Figure 9:
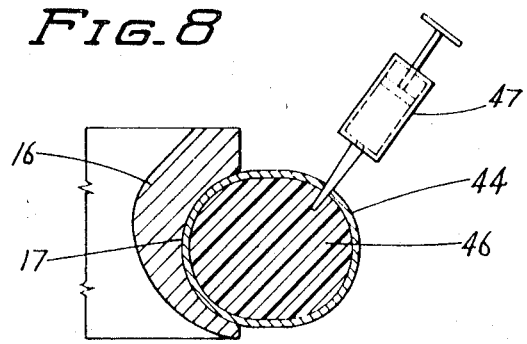
Figure 6:
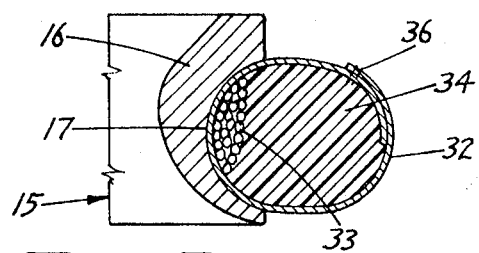
Figure 10:
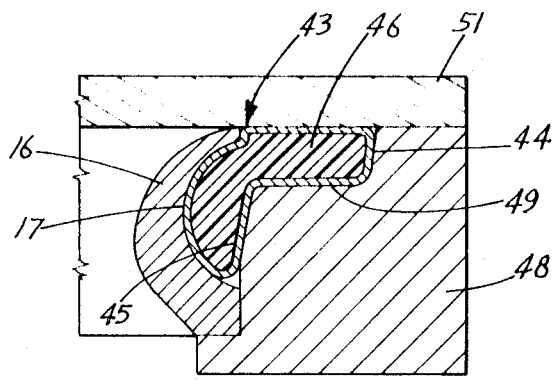
Figure 7:
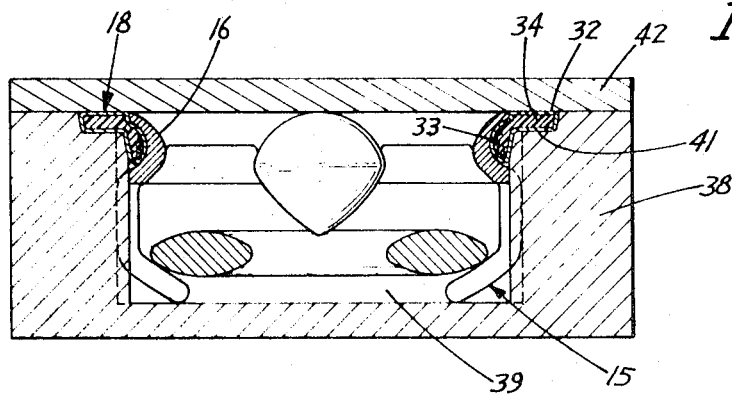

In the drawings:
FIG. 1 is a plan view of a heart valve in assembled relation with the suturing member of the invention;
FIG. 2 is a cross sectional view taken along the line 2—2 of FIG. 1;
FIG. 3 is an enlarged cross sectional view of the base of the heart valve and suturing member;
FIG. 4 is an enlarged sectional view showing the first step of assembling the cover on the base of the heart valve;
FIG. 5 is a view similar to FIG. 4 showing the placement of the core of uncured plastic material around the cover;
FIG. 6 is a view similar to FIG. 4 showing the cover closed about the core of uncured plastic material;
FIG. 7 is a sectional view showing the closed cover and encased core of plastic material shaped in the curing mold;
FIG. 8 shows a modified tubular cover placed around the base of a heart valve;
FIG. 9 is a view similar to FIG. 7 showing the filling of the tubular cover with a core of uncured plastic material; and
FIG. 10 is a view showing the filled cover of FIG. 9 placed in a curing mold to shape and to cure the plastic material.

Referring to the drawings, there is shown in FIGS. 1 and 2 a heart valve, indicated generally at 15, having an annular base 16 with an outwardly open annular groove 17 for accommodating a suture fixation ring or sewing collar, indicated generally at 18. The collar 18 provides a means of connecting the heart valve with the heart tissue to hold the valve permanently in operative position. The collar rigidly held in position on the valve base has an annular flange or pad which the surgeon can penetrate with his needle when the valve is sewed to the living heart tissue. The collar 18 has sufficient rigidity so that it does not flex when hydraulic pressure is exerted against the valve. The suturing member of the invention can be used to hold other artificial devices permanently in operative positions in a living body or creature. The following description is limited to collar 18 mounted on a base of a toroidal heart valve as shown in U.S. Pat. No. 3,438,394. Other types of heart valves can be equipped with the suturing collar of the invention.

The heart valve 15 has an annular element 19 movable axially relative to a circular opening in the base 16 to open and close the opening in the base. Valve element 19 is a torus having a generally elliptical shape in cross section with a continuous outer peripheral surface 21 and a continuous inner peripheral surface. When the element 19 is in the closed position, a circumferential portion of the outer peripheral surface 21 engages a circumferential seat 23 on the inside of the base surrounding the opening.

Located along the longitudinal axis of the base 16 is a center member 24 which cooperates with the valve element 19 to substantially close the opening in the base restricting the flow of fluid in one direction through the opening. Center member 24 has a generally tear drop shape and is positioned centrally in the opening in base 16. Circumferentially spaced radial legs 26 and 27 rigidly support the center member 24 on the base 16. A number of legs or a single leg can be used to secure the center member 24 to the base 16.

An open cage 28 extended upwardly from the base directs the movement of the valve element 19 and determines the open position of the valve element. The cage means 28 comprises a plurality of upright arms 29 having inwardly directed to fingers 31. As shown in FIG. 2, the fingers 31 function as stops for the valve element 19. The open cage 28 permits the valve element 19 to have free floating and rotational movement between its open and closed positions.

Referring to FIG. 3, there is shown the collar 18 in assembled relation with the base 16. Collar 18 comprises a cover 32 of porous material held in the groove 17 with a plurality of cords or threads 33. Located within the cover 32 is a body or core of plastic material 34 bonded to the inside surface of the cover 32. Stitches 36 are used to secure opposite ends of the cover 32 together to form a continuous cover member. The collar 18 has an outwardly directed annular flange or cuff 37 providing a sewing ring for attaching the valve to the heart tissue.

Cover 32 is a biological inert porous material that is compatible with the chemicals and fluids of the body and does not deteriorate with time. The material can be an interlaced or knitted fabric to provide a mesh or spaces into which the living tissue grows in the process of healing to form a permanent union with the collar and the living tissue independently of the sutures applied by the surgeon. The collar can be made entirely of a synthetic fiber, as Du Pont, "Teflon" cloth or "Dacron" cloth. The cord 33 is a wrapping thread, as "Nylon" thread, which firmly holds the cover 32 in the groove 17. The core material 34 is a plastic pliable material in the uncured state that is compatible with the human tissue and body fluids. In addition, the core material 34 is sterilizable, biological, inert, nonirritating, and nontoxic to the body fluids or body tissues. On the curing of the plastic material, a bond between the inside surface or face of the cover and the plastic material is achieved to eliminate any pockets or separation of the cover from the core material which can collect blood and other body fluids. The core material is preferably a plastic material, such as Dow Corning "Silastic", fluorosilicone rubber or a similar synthetic resinous plastic material. The core material cures at a relatively low temperature to a semi-rigid relatively nonelastic plastic which retains its molded shape. The mold determines the ultimate shape of the collar so that mitral and aortic collars can be made with different molds.

Referring to FIGS. 4 to 6, there is shown the process of attaching and forming the suture fixation collar on hte base 16 of the heart valve 15. Referring to FIG. 4, the cover 32 made into a cylinder or sleeve is placed about the base 16. The cord 33 is wrapped about the cover 32 tightly holding the cover 32 in the groove 17 of the base 16. The cord may have a portion woven into the cover 32 to provide a positive connection between the cords and the cover. The uncured plastic core material 34, as shown in FIG. 5, is formed into an elongated roll and uniformly placed around the cover 32 adjacent to the cords 33. The plastic core material, being uncured, is in a relatively pliable and malleable state so that a measurable amount of material can be extruded from a container or a press. Preferably, the roll of uncured plastic core material is weighed so that a determinative amount of material can be placed around the cover 32.

Referring to FIG. 6, the cover 32 has been wrapped around the plastic core material 34. The end portions of the cover 32 are lapped and attached together with stitches 36. The stitches 36, located closely adjacent to the base 16 extend all around the base.

As shown in FIG. 7, the entire heart valve 15 with the uncured suture collar 18 is placed within a mold 38 having a center cavity 39 joined with a peripheral annular cavity 41. The collar 18 is pressed into the mold cavity 41 whereby the shape of the collar is changed to conform to the mold cavity 41 to form the outwardly directed peripheral flange 37. The collar 18 is located in the mold cavity with a light force fit so that the cover 32 is in continuous engagement with the plastic core material 34. The entire valve and collar 18 are retained in the mold cavity with a cover or flat plate 42. The core material 34 is cured by heating the mold for a period of time. For example, with core material of Silastic, the mold is heated for a period of five minutes at 220 degrees F. During the curing process, the core material 34 bonds to the inside surface or face of the cover 32 to form a continuous and permanent connection between the core material 34 and the cover 32. This bond eliminates the spaces or cavities between the core material 34 and the cover 32. The plastic core material 34 does not penetrate the fabric of the cover whereby the cover retains the porous characteristic and ability to have good tissue ingrowth. The plastic core material 34 being nonabsorbent does not soak up blood or other body fluids.

After the suture collar 18 is cured, the heart valve 15 along with the collar 18 is removed from the mold 38. The relatively low temperature of the curing of the plastic core material 34 does not have any harmful effects on the metal valve base 16 or valve element 19.

Referring to FIG. 8, there is shown a modified suture fixation ring or collar 43 mounted on the base 16 of the heart valve. Base 16 has an inwardly directed peripheral groove 17 accommodating the suture fixation collar 43. Collar 43 comprises an annular cover 44 enclosing plastic core material 46. Cover 44 is of a fabric material similar to the material of cover 32 shown in FIG. 3. The plastic core material 44 is a mixture of the plastic core material 34 with evenly dispersed small plastic threads, as nylon or Teflon, to reinforce the plastic material. Preferably, the plastic core material is a Silastic filled with small Teflon or nylon threads.

Referring to FIG. 9, the annular cover 44 is a tubular fabric placed on the base 16 in the groove 17. The cover 44 being a continuous annulus has approximately the same inside diameter as the diameter of the groove 17. As shown in FIG. 10, the plastic core material 46 is placed into the cover 44 with an injector 47 to fill an annular cavity within the cover 44. A measured amount of core material is injected into the cover.

As shown in FIG. 10, the heart valve together with the collar 43 with the uncured plastic core material 46 is placed within a mold 48 having an annular cavity 49 of a shape outlining the final shape of the fixation collar. The shape of the cavity may be altered as required by the final shape of the suture fixation collar. The uncured plastic material being readily deformable conforms to the shape of the mold cavity. The collar 43 is forced into the cavity so that it firmly positions the plastic core material 46 in surface contact with the cover 44. The mold is closed with a lid or plate 51 to confine the suturing collar 43 to the mold cavity. The plastic core material 46 is cured and bonded to the cover 44 on the application of heat to the mold. The plastic material 46 bonds to the entire inside surface or face 45 of the cover 44 and does not penetrate the fabric material of the cover whereby the fabric cover retains its tissue ingrowth capabilities.

While the invention has been described with respect to preferred embodiments of the structure and processes of forming and joining a suture fixation member to an artificial device implantable in a body of a living creature, various changes in shape, size, and materials of the suturing member may be made by those skilled in the art without departing from the spirit of the invention. For example, cords 33 can be metal wire and the tubular annular cover 44 can be made from a heat curable plastic material having a high concentration of fibers, as the Teflon fibers. This cover can surround a core material of reinforced plastic material. The fibers carried in the cover provide cavities and spaces for the tissue ingrowth, as well as providing a reinforcing for holding the suturing collar on the artifiicial implantable device. The cover may surround only a portion of the outer surface of the core plastic material leaving a portion of the core plastic material exposed. Inserts of metal and/or plastic members and the like rigid or semi-rigid members, as wire, rods, cylinders, tubes, can be encased or partially encased in the plastic core material. Portions of the inserts may project axially, laterally, or outwardly from the core plastic material and cover. The suturing member can be used with implantable devices other than heart valves that are attachable to tissue and require ingrowth tissue. Devices for connecting veins and arteries can be provided with the suture fixation structure of the invention. The device may have a portion made with the suturing member, as the base of a heart valve.

The embodiments of the invention in which an exclusive property or privilege is claimed are defined as follows:

1. A process of making a suturing member and mounting the suturing member on a device having an annular outside portion for holding the suturing member comprising: placing a cover of porous material around the device with part of the cover adjacent said outside portion of the device, positioning uncured core plastic material adjacent the cover, enclosing the core plastic material within the cover, forming the suturing member on the device by pressing the cover and enclosed core plastic material into a desired shape and positioning the uncured plastic material in engagement with the inside surface of the cover, and heating the cover and enclosed core plastic material to cure the core plastic material and bond the core plastic material to the inside surface of the cover to maintain said shape of the suturing member.

2. The process of claim 1 wherein: a measured amount of uncured plastic material is positioned adjacent the cover.

3. The process of claim 1 including: securing the cover around the device before the uncured plastic material is placed around the cover.

4. The process of claim 1 including: stitching the cover together to enclose the plastic material within the cover.

5. A process of making a suturing member and mounting the suturing member on a device having a portion on the outer side thereof for accommodating the suturing member comprising: providing a cover of porous material, placing said cover around the device in said portion on the outer side thereof, encasing a core of uncured plastic material within the cover, forming the suturing member on the device by pressing the cover and encased uncured plastic material into a desired shape around the device and positioning the uncured plastic material in engagement with the inside surface of the cover, and curing the plastic material and bonding the plastic material to the inside surface of the cover to maintain said shape of the suturing member.

6. The process of claim 5 wherein: the cover is tubular porous material and said plastic material is injected into the tubular space within the cover.

7. The process of claim 5 wherein: the cover is wrapped around the uncured plastic material to encase the plastic material with the cover.

8. The process of claim 5 wherein: the formed cover and encased uncured plastic material is cured in response to heat.

9. The process of claim 5 wherein: the uncured plastic material is enclosed within the cover by lapping and attaching end portions of the cover together.

10. The process of claim 5 wherein: the suturing member is formed on the device by pressing the suturing member into a mold cavity having the desired shape.

11. The process of claim 5 wherein: a measured amount of uncured plastic is positioned adjacent a portion of the cover before it is encased within the cover.

12. The process of claim 5 including: stitching the cover together to enclose the plastic material within the cover.

13. The process of claim 5 including: forming the uncured plastic material into an elongated roll and placing said elongated roll of uncured plastic material around the cover before the plastic material is enclosed within the cover.

14. A process of making a suturing member and mounting the suturing member on a device having an outside portion for holding the suturing member comprising: providing a cylindrical cover of a size to fit around said device, placing said cover around a device with a section of the cover adjacent the outside portion of the device, holding said section of the cover in engagement with said outside portion, locating uncured plastic material around said section of the cover, enclosing the plastic material within the cover, forming the suturing material on the device by pressing the cover and enclosed plastic material into a desired shape and positioning the uncured plastic material in engagement with the inside surface of the cover, and heating the cover and enclosed plastic material to cure the plastic material and bond the plastic material to the inside surface of the cover to maintain said shape of the suturing member.

15. The process of claim 14 wherein: the uncured plastic material is enclosed within the cover by lapping and attaching end portions of the cover together.

16. The process of claim 14 wherein: the suturing member is formed on a device for pressing the suturing member into a mold cavity having the desired shape.

17. The process of claim 14 wherein: a measured amount of uncured plastic material is located around said section of the cover.

18. The process of claim 14 including: stitching portions of the cover together to enclose the plastic material within the cover.

19. The process of claim 14 including: forming the uncured plastic material into an elongated roll before it is placed around the section of the cover.

References Cited

UNITED STATES PATENTS

| | | | |
|---|---|---|---|
| 1,998,817 | 4/1935 | Meyer | 264—45 |
| 3,108,852 | 10/1963 | Olsen | 264—266 X |
| 3,125,346 | 3/1964 | Poltorak | 29—445 UX |
| 3,146,285 | 8/1964 | Munk | 264—266 |
| 3,365,728 | 1/1968 | Edwards et al. | 3—1 |

CHARLIE T. MOON, Primary Examiner

U.S. Cl. X.R.

3—1; 29—527.1; 264—45, 257, 266